United States Patent [19]
Williams

[11] Patent Number: 5,733,007
[45] Date of Patent: Mar. 31, 1998

[54] REMOTE RELEASE RECLINER DEVICE

[75] Inventor: Jason L. Williams, Battle Creek, Mich.

[73] Assignee: Exel Industries, Inc., Elkhart, Ind.

[21] Appl. No.: 696,202

[22] Filed: Aug. 13, 1996

[51] Int. Cl.⁶ ................................................ B60N 1/06
[52] U.S. Cl. .......................... 297/367; 297/367; 297/366
[58] Field of Search .................................. 297/367, 366

[56] References Cited

U.S. PATENT DOCUMENTS

| | | | |
|---|---|---|---|
| 2,311,105 | 2/1943 | Will | 297/367 |
| 3,901,100 | 8/1975 | Iida et al. | 297/367 X |
| 4,487,453 | 12/1984 | Emmerich et al. | 297/367 |
| 4,634,182 | 1/1987 | Tanaka . | |
| 4,659,146 | 4/1987 | Janiaud | 297/367 |
| 4,765,680 | 8/1988 | Kawashima | 297/367 |
| 4,765,681 | 8/1988 | Houghtaling et al. . | |
| 4,789,205 | 12/1988 | Pipon et al. | 297/367 |
| 4,872,726 | 10/1989 | White et al. . | |
| 4,875,735 | 10/1989 | Moyer et al. | 297/367 |
| 5,028,091 | 7/1991 | Zaveri . | |
| 5,433,507 | 7/1995 | Chang . | |
| 5,474,360 | 12/1995 | Chang . | |

FOREIGN PATENT DOCUMENTS

| | | | |
|---|---|---|---|
| 2931915 | 2/1981 | Germany | 297/367 |
| 3027629 | 2/1982 | Germany | 297/367 |
| 590531 | 4/1959 | Italy | 297/366 |
| 20523 | 2/1977 | Japan | 297/367 |
| 196856 | 9/1964 | Sweden | 297/367 |

*Primary Examiner*—Peter M. Cuomo
*Assistant Examiner*—David E. Allred
*Attorney, Agent, or Firm*—Banner & Witcoff, Ltd.

[57] ABSTRACT

A recliner device has a pair of recliner mounting brackets, an arm and a pawl, both pivotally mounted on one of the brackets, and a sliding wedge holding the pawl in latching engagement with the arm. The wedge is slidably attached to one of the brackets and supported on a base of one of the brackets. When the recliner is in a locked position, a wedge end of the wedge is engagement between a wedge contact surface of the pawl and the base segment of the bracket to maintain a toothed section of the pawl in engagement with a toothed section of the arm. When the recliner moves into an unlocked position, the wedge end is separated from the wedge contact surface to release the pawl from engagement with the arm. A pivotally mounted cam engages a distal end of the wedge and allows manual control of the wedge position. The brackets preferably have embossed sections which restrict non-planar travel of the pawl, wedge and cam.

19 Claims, 5 Drawing Sheets

REMOTE RELEASE RECLINER DEVICE

FIELD OF THE INVENTION

The present invention generally relates to recliners, and more particularly to recliners used for seat back position adjustment.

BACKGROUND OF THE INVENTION

Recliners are used to adjust the position of, for example, a seat back relative the base of the seat, particularly in motor vehicles. The adjustability of the angular position of the seatback of a seat using a recliner allows a person sitting in the seat to find a seatback position that provides good support or comfort, and recliners have become standard features in motor vehicles.

An automobile recliner for adjusting the seatback position typically employs a form of ratchet mechanism which includes a combination of an arm and a pawl. The arm typically is attached to the seatback and pivotally mounted relative to the seat base, and has a toothed region. The pawl also has a toothed region designed for releasable latching or locking engagement with the toothed region on the arm. During seatback position adjustment, the pawl is disengaged from the arm to allow pivotal movement of the seatback. After the seatback is moved into a desired position, the pawl is reengaged with the arm to lock seatback in position.

The recliner is typically actuated by control means, such as a taumel or rotary mechanism, by a hand lever, or electronically though the use of motors, wires and electronic controls. The recliner is typically positioned near the seat back. It is generally preferred to place manual control means for manual release of the ratchet mechanism of the recliner closer to the front end of the seat base, where it is more convenient for the person sitting in the seat.

In order to accommodate manual control at a location remote from the reclining device, a linking means such as a cable, an extension rod or the like, has been used in the past. Those arrangements generally increase the complexity of the recliner mechanisms. Several designs have been tried to provide a remote release actuated recliner. For example, U.S. Pat. No. 4,634,182 to Tanaka discloses an arm having a toothed section, an elongate pawl having a toothed section interlocking with the toothed section of the arm, and a spring biased cam which moves the pawl from engagement to non-engagement positions. Problems with such designs include that the motion of the elongate pawl is not controlled, and the pawl may flex when subjected to high loads, allowing for disengagement of the teeth. Moreover, the design is sensitive to manufacturing tolerances and wear, and may be prone to rattling.

U.S. Pat. No. 5,474,360 to Chang discloses an arm and a pawl, and a linkage mechanism comprising a cam biasing the pawl, a rod connecting the cam to an operator for remotely disengaging the pawl from the arm. A large spring is attached at one end to the rod and at the other end to a mounting plate to bias the rod into a locking position in an attempt to minimize rattle. While this design does act to provide a release remote from the seat back, it has many separate components resulting in a design that is complex, and of high cost. In addition, operational problems such as rattling from tolerance stack-up errors can occur, and the drive arm is of a large size, forcing the seat design to be larger to accommodate the pivoting drive arm and taking up valuable space in the interior of a vehicle. Moreover, it is possible for foreign matter to enter into the mechanism between the side plates and interfere with the operation of the recliner.

When an automobile undergoes rapid change in speed the inertial force of the seatback of a reclining seat in that automobile due to the mass of the seatback can be quite substantial, and such inertial force is transmitted to the pawl in the ratchet mechanism of the recliner. In designs using a cam to urge the pawl toward the locked position, all the force transmitted to the pawl is ultimately born by the pivot pin of the cam, which must be of a sufficiently robust design to have satisfactory structural strength.

It is an object of the present invention to provide a recliner with a manual release means at a convenient position that is of low cost and of a simple, yet robust design.

It is an additional object of the present invention to provide a remote release recliner device for a motor vehicle seat, with improved structural strength to more reliably hold the seatback in position, eliminating rattling and providing improved ability to withstand rapid changes in speed.

SUMMARY OF THE INVENTION

In accordance with a first aspect, there is provided a recliner or recliner device movable from a locked position to an unlocked position. The recliner has a ratchet mechanism which uses a slidable wedge riding on a base of a recliner mounting bracket to hold a pawl in latching engagement with an arm. The arm is preferably fixedly attached to a pivotable member, for example a vehicle seat or armrest, and pivotally mounted on the bracket and has a toothed sector. The pawl is pivotably attached or connected to the bracket, and preferably has an elongated arcuate toothed section for engaging the toothed sector of the arm, and a wedge contact surface positioned generally opposite the arcuate toothed section. The wedge has a wedge end and a distal end and is slidably adjustably attached to the bracket and slidingly supported on a base segment of the bracket for sliding movement between the locked position and the unlocked position. When the recliner is in the locked position, the wedge end directly engages the wedge contact surface of the pawl to maintain the arcuate toothed section of the pawl in engagement with the toothed sector of the arm.

To disengage the teeth of the pawl from the teeth of the arm and unlock the arm, a release lever may be used. The release lever is preferably attached to a cam having a cam surface and a cam thumb as described further below.

When the recliner moves into the locked position the cam surface contacts the distal end of the wedge, forcing the wedge rearward into engagement with the pawl, which in turn forces the toothed section of the pawl into locking engagement with the toothed section of the arm. Preferably a spring is mounted on the recliner bracket which rotationally biases the cam surface towards the distal end of the wedge.

When the recliner moves to the unlocked position the cam thumb rotates into a wedge slot and contacts a wedge hook. Continued rotation of the cam forces the wedge to slide forward, disengaging the pawl. In a highly advantageous feature of certain preferred embodiments of the invention, the wedge has a positive drive out projection which engages a pivot knob extending from the pawl to force the pawl toothed section out of locking engagement with the toothed section of the arm.

To minimize motion that is not in the plane of travel of the inner componentry, including the cam, wedge, pawl and arm, preferably a pair of recliner mounting brackets are used, sandwiching the inner componentry. Embosses project from the brackets to further restrict any non-planar travel motion.

In accordance with a second aspect, recliner for a motor vehicle seat has an improved remote release mechanism, allowing for comfort adjustment of a seat back by the occupant of the vehicle seat without having to reach near the seat back. The recliner has a pair of seat recliner mounting brackets which hold a ratchet mechanism that allows for adjustment of the seat back. The ratchet mechanism comprises an arm fixedly attached to the seat back and pivotably attached to one of the mounting brackets, and a pawl. The arm and pawl each have toothed sections which lockingly engage one another in the manner described above. A generally elongate wedge is connected to means for disengaging the toothed sections. The recliner should not unlock even during rapid changes in the speed of the motor vehicle. To prevent disengagement in such circumstances, the wedge is restricted to a narrow travel path by embosses on the recliner mounting brackets.

In accordance with a third aspect, there is provided a seat for a motor vehicle having a remote release recliner. The seat has a seat back and a seat base which meets the seat back near the back of the seat base, and at least one remote release recliner is positioned near the back of the seat base to allow the seat back to pivot relative the seat base.

BRIEF DESCRIPTION OF THE DRAWINGS

The accompanying drawings incorporated in and forming a part of the specification, illustrate several aspects of the present invention, and together with the description serve to explain the principles of the invention.

Certain preferred embodiments are discussed below with reference to the appended drawings wherein.

Figure 1:
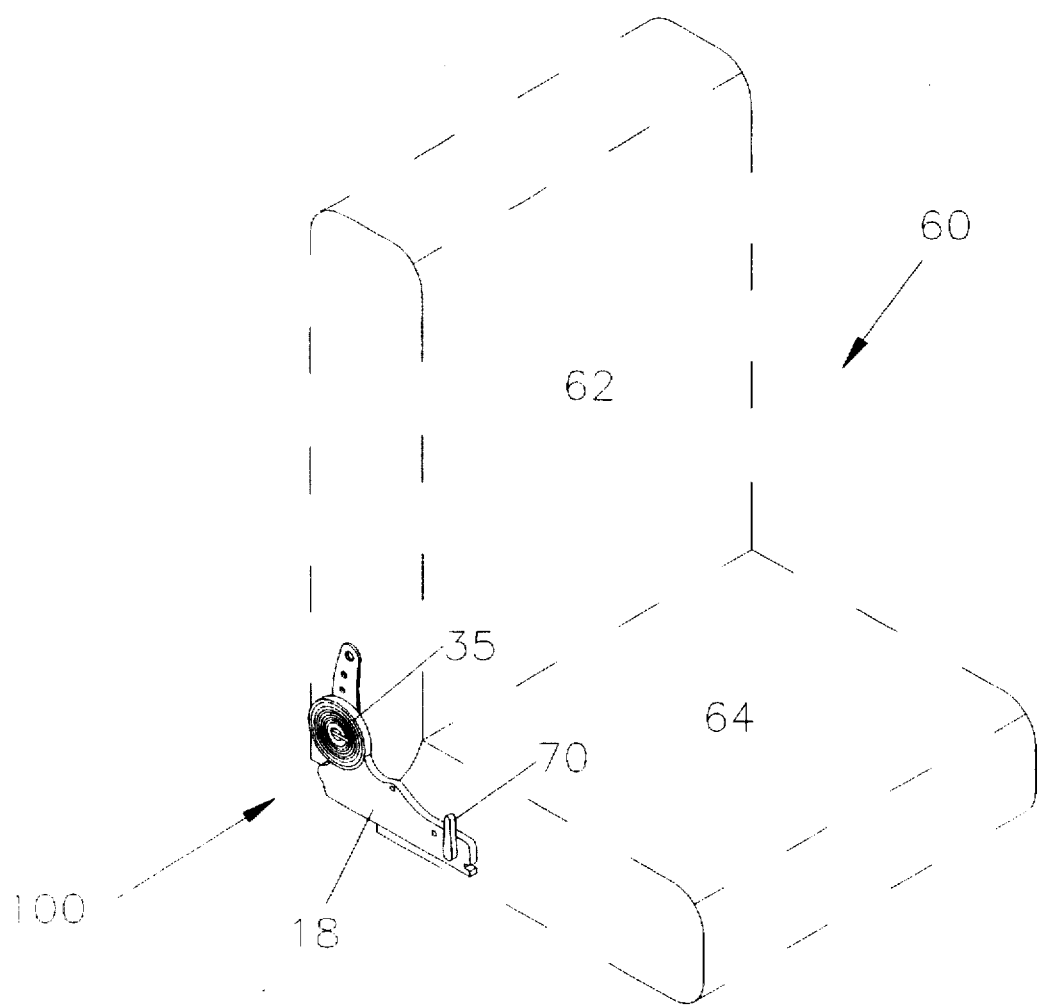
FIG. 1 is a perspective view of a preferred embodiment of a recliner device showing an installation position in a seat.

It should be understood that the appended drawings are not necessarily to scale, presenting a somewhat simplified representation of various preferred features illustrative of the basic principles of the invention. The specific design features of a recliner device as disclosed here, including, for example, specific dimensions of the teeth and number of teeth on the arm and on the pawl, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the recliner device illustrated in the drawings. In general, front or frontward refers to a rightward direction in the plane of the paper in FIG. 2, and rear, rearward or backwards refers to a left direction in the plane of the paper in FIG. 2. Clockwise and counterclockwise rotation shall be with reference to the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the recliner devices disclosed here. The following detailed discussion of various alternative and preferred features and embodiments will illustrate the general principles of the invention with reference to a recliner with a remote release mechanism for use in a motor vehicle seat. Other embodiments suitable for other applications, such as recliners for armrests, will be apparent given the benefit of this disclosure.

Figure 2:
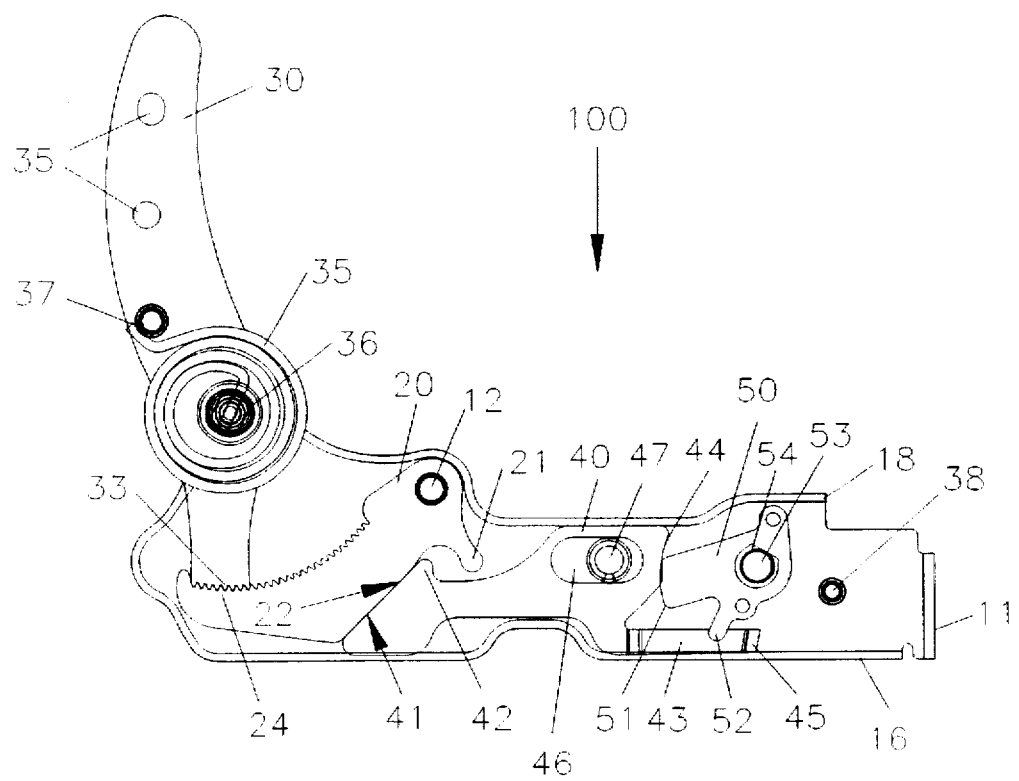
FIG. 2 is a partially cut-away side elevation of a preferred embodiment of a recliner device having a slidable wedge shown in a locked position, preventing rotation of the arm.

Referring now to the drawings, FIG. 2 is a side view of a preferred embodiment of a recliner 100 constructed according to the teaching of the present invention in a locked position which can be mounted on a motor vehicle seat as shown in FIG. 1. The recliner device 100 uses a ratchet mechanism which includes a seatback arm 30 and a pawl 20, both of which are pivotally mounted on a recliner mounting bracket 18. The recliner device can move from a locked position, shown in FIG. 2, to an unlocked position, shown in FIG. 3. When used on a recliner seat 60, as shown in FIG. 1 in dashed lines, for seat back position adjustment thereof, the seatback arm 30 is attached to the seatback 62 of the recliner seat 60, and recliner mounting brackets 17, 18 are attached to the seat base 64.

At the lower end of the arm 30 of the recliner 100 is a toothed sector 33, which has teeth disposed arcuately about the pivot axis of the arm. The arcuate length of the toothed section of the pawl 20 determines the range of angular position of the arm 30. To form a ratchet mechanism, the pawl 20 has a toothed section 24 which interlockingly or meshingly engages the toothed sector 33, restricting the motion of the arm 30 when the recliner 100 is in the locked position, as shown in FIG. 2.

The arm 30 is pivotally mounted on a pivot pin 32 on the bracket 18. The upper portion of the arm may be securely attached to the seat back 62 of the seat 60 for support thereof and to allow pivotal movement of the seat back. In the present embodiment, a plurality of apertures 38 are provided on the upper portion of the arm and on the mounting brackets to allow attachment of the recliner 100 to the seat 60 using threaded fasteners or the like. The toothed section 33 of the arm 30 is arcuately disposed about the axis of the pivot pin 32. The toothed section 24 on the pawl is also disposed on an arcuate surface having the same radius of curvature as the toothed sector of the arm. In this way, the position of pawl in which the toothed sections engage with each other does not vary with the angular position of the arm 30.

To prevent the seatback from collapsing into its lowest position when the pawl 20 is disengaged from the arm 30, biasing means such as spring 35 is provided to bias the arm 30 towards its full upright position. In the present embodiment, the spring is a coil or counterbalance spring. The inner end of the coil spring is anchored on the pivot pin 32 which is non-rotatably held in the bracket 18, and biasing force is exerted on the pin 37 fixedly attached to the arm 30.

The pawl 20 is pivotally mounted on a pivot pin 12 on the bracket 18. The elongated arcuate toothed section 24 is disposed on the side of the pawl 20 facing the arm. The teeth of the toothed section are configured for meshing engagement with the toothed sector of the arm when the pawl is in the engaged or locked position. Preferably the toothed section 24 of the pawl is elongate, that is, there are more teeth on the pawl 20 than there are on the arm and the toothed section 24 of the pawl 20 defines the maximum travel path of the arm 30. Elongating the pawl minimizes the required size for the toothed section of the pivotable arm 30, thereby reducing the amount of space taken up by the recliner, space which is at a premium for the interior design of motor vehicles.

In accordance with a highly advantageous feature of this invention, the engagement of the pawl 20 with the arm 30 is maintained by means of a wedge 40 having a wedge end 41 which contacts a preferably generally elongate wedge contact surface 22 of the pawl positioned on the side opposite the toothed section 24 of the pawl. This advantageously minimizes chucking or rattling as the recliner is subjected to uneven and rapidly changing forces, as in the case of a motor vehicle in motion. The wedge 40 is slidably mounted on the bracket 18 by means of a slot 46 and a bolt or rivet 47 attached to the bracket and rides on a base segment 16 of the bracket 18. To hold the pawl 20 in engagement with the arm 30, the wedge 40 slides into a position in which it engages and underlies the pawl to keep the pawl toothed section 24 locked to the arm toothed section 33. If position adjustment is to be made, the wedge 40 slides linearly forward (that is, to the fight in FIG. 3) to allow the pawl to disengage from the arm.

Figure 3:
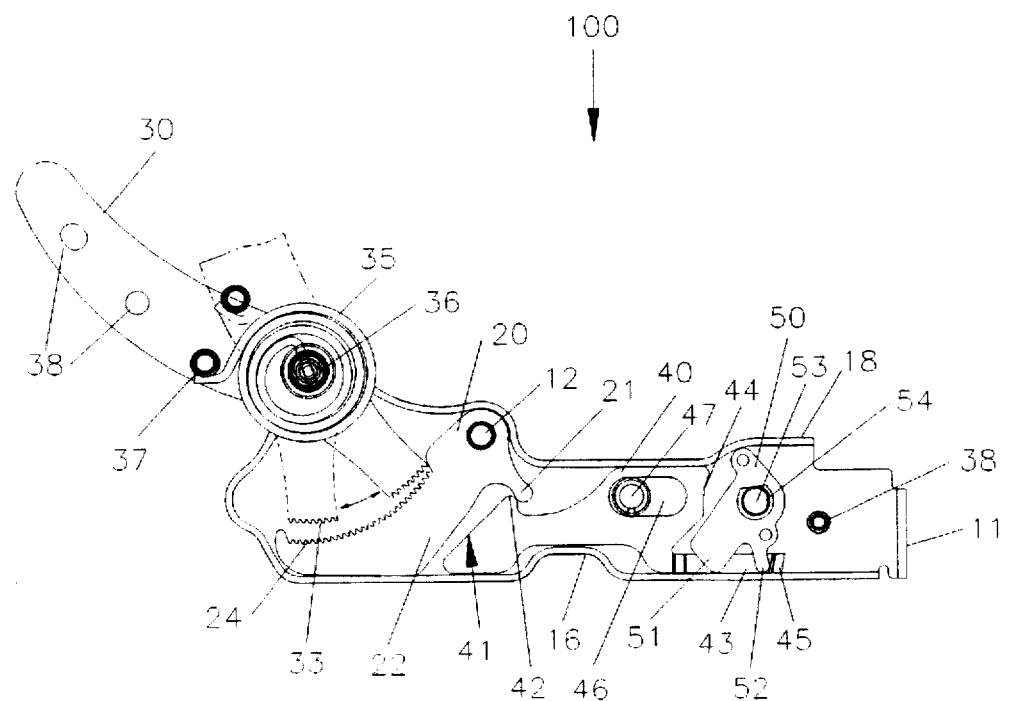
FIG. 3 is a partially cut-away side elevation of the recliner device in an unlocked position.
Figure 4:
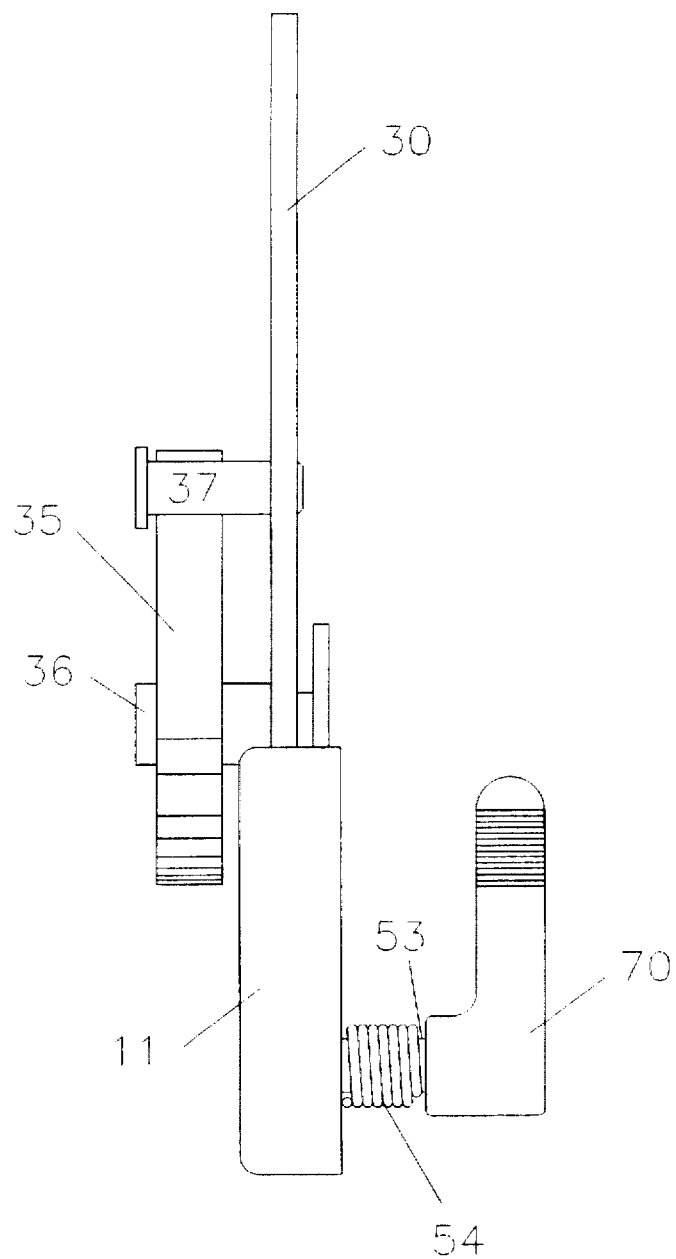
FIG. 4 is a front elevation view of the recliner device of FIGS. 1–3.

The center of gravity of the pawl 20 is such that as the wedge end of the wedge disengages the wedge contact surface, the pawl will rotate towards the wedge. To ensure disengagement of the pawl from the arm, the pawl preferably has a pivot knob 21. The wedge is trapped by the bracket 18 to travel only linearly in its own plane, preferably in the forward and rearward directions as shown in FIGS. 2–3. As the wedge slides forward from the locked position to the unlocked position, a positive drive out projection 42 on the wedge engages the pivot knob 21, forcing the pawl 20 to rotate counterclockwise out of engagement with the arm 30.

Means are provided for remotely moving the recliner from the locked position to the unlocked position. In the present embodiment, the means for moving the recliner comprises a release lever 70 fixedly attached to a rotatable cam 50. The cam 50 preferably is mounted on the bracket 18 close to the front end of the seat base 64. As best seen in FIGS. 2–3, the cam 50 is mounted on a shaft 53 which is rotatably mounted on the bracket 10 so that rotating the shaft rotates the cam 50 into different positions. The cam 50 has a cam thumb 52 for engaging a wedge hook 45 provided on an extension of the wedge 40. When the cam 50 is rotated counterclockwise, the cam thumb 52 rotates into a wedge slot or channel 43 where the thumb 52 eventually engages the wedge hook, thereby pulling the wedge 30 away from the pawl 20 and moving the recliner into the unlocked position. When the cam is rotated clockwise, a cam surface 51 engages the distal end 44 of the wedge, forcing the wedge 40 against the pawl 20 and the pawl 20 against the arm 30, locking the recliner 100 to restrict motion of the seat back. Preferably a spring 54 mounted on shaft 53 biases the cam towards the distal end of the wedge, and manual actuation of the release lever 70 is needed to overcome this force to disengage the pawl from the arm.

The recliner brackets 17, 18 preferably at least sandwich the ratchet mechanism and other inner componentry, including the cam 50, wedge 40, pawl 20 and arm 30, and preferably at least one of the recliner brackets has a main segment and segments perpendicular to the main segment to enclose the inner componentry on all at least five sides, leaving only access where necessary to allow the arm to pivot.

Figure 5:
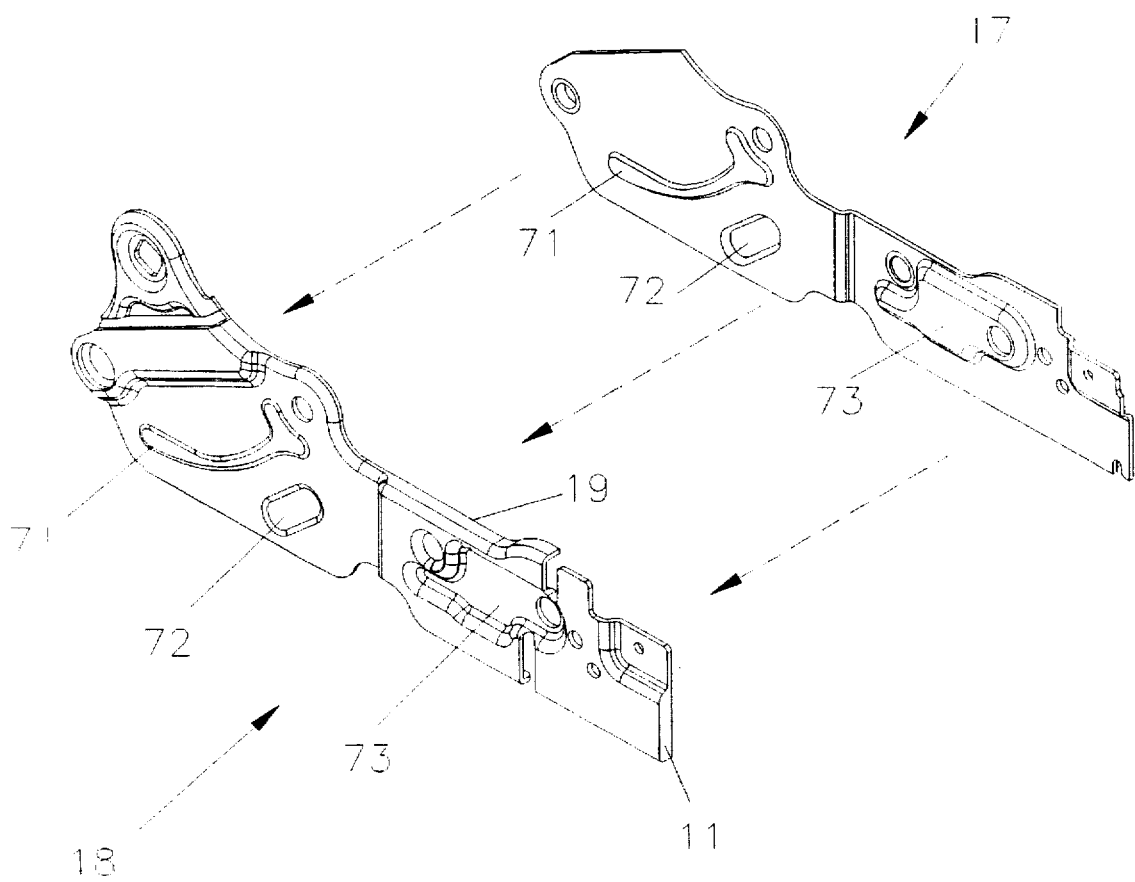
FIG. 5 is a perspective view of mounting brackets designed to sandwich and cover the inner componentry of the recliner and to minimize motion that is not along the plane of travel of the cam, wedge, pawl and arm.

In more detail, the bracket in the embodiment shown in FIG. 5 includes an outer plate 17 and an inner plate 18 forming a sandwich structure in which the ratchet mechanism is disposed. In FIGS. 2 and 3, the inner plate 17 is removed in order to reveal the inner componentry or internal structure of the recliner device. The bracket 18 has base segment 16 which supports the wedge, a top segment 19 which covers the internal structure and a front segment 11. Preferably the base segment 16 is integrally formed with, and most preferably unitary with the bracket to provide good structural strength. In the illustrated embodiment, the base segment 16, the top segment and the front segments are a portion of the outer plate 18 bent at a generally right angle and extending beyond the sandwich structure of the bracket. Preferably each bracket has a series of indented or embossed portions 71, 72, 73. Each embossed portion is positioned to minimize non-planar motion of the inner componentry; 71 for the pawl, 72 for the wedge and 73 for the cam.

From the foregoing disclosure and detailed description of certain preferred embodiments, it will be apparent that various modifications, additions and other alternative embodiments are possible without departing from the true scope and spirit of the invention. For example, in motor vehicles where additional strength is desired in the event of rapid changes in speed, a pair of recliners can be can be used, each mounted on one side of the vehicle seat and connected by a cable or other suitable connection means, preferably between cam thumbs 52. Alternatively, the recliner device may be used in an armrest. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A recliner moveable from a locked position to an unlocked position comprising, in combination:

a first recliner mounting bracket;

an arm pivotably mounted on the bracket, and having a toothed section;

means for biasing the arm toward a full upright position;

a pawl pivotably mounted on the bracket, comprising a toothed section lockingly engageable with the toothed section of the arm, and having a wedge contact surface;

a wedge adjustably attached to the bracket, having a wedge end and a distal end, wherein the wedge end directly biases the wedge contact surface of the pawl when the recliner is in the locked position, the wedge being linearly slidable back and forth between its locked position and its unlocked position; and means for moving the recliner between the locked position and the unlocked position.

2. A recliner moveable from a locked position to an unlocked position comprising, in combination:

a first recliner mounting bracket;

an arm pivotably mounted on the bracket, and having a toothed section;

a pawl pivotably mounted on the bracket, comprising a toothed section lockingly engageable with the toothed section of the arm, and having a wedge contact surface;

a wedge adjustably attached to the bracket, having a wedge end and a distal end, wherein the wedge end directly biases the wedge contact surface of the pawl when the recliner is in the locked position, the wedge being linearly slidable back and forth between its locked position and its unlocked position and means for moving the recliner between the locked position and the unlocked position, comprising a cam pivotally mounted on the bracket and moveable between the locked position in which the cam forces the wedge end of the wedge against the contact surface of the pawl, and an unlocked position in which the cam pulls the wedge, allowing the pawl to rotate to disengage the toothed section of the pawl from the toothed section of the arm.

3. The recliner of claim 2 wherein the cam has a cam surface and a spring is mounted on the bracket urging the cam surface towards the distal end of the wedge.

4. The recliner of claim 3 wherein the means for moving the recliner further comprises a manual release lever attached to the cam for disengaging the cam from, the distal end of the wedge.

5. The recliner of claim 3 wherein the wedge has a wedge channel and a wedge hook, and the cam has a cam thumb which, as the cam rotates, enters the wedge channel and contacts the wedge hook, forcing the wedge to slide away from the pawl.

6. The recliner of claim 2 wherein the means for moving the recliner between the locked position and the unlocked position further comprises a positive drive out projection on the wedge engaging a pivot knob extending from the pawl, rotating the toothed section of the pawl out of engagement with the toothed section of the arm.

7. The recliner of claim 1 wherein the arm is pivotable when the recliner is in the unlocked position.

8. The recliner of claim 2 further comprising means for biasing the arm towards a full upright position.

9. The recliner of claim 1 wherein the toothed of the arm is arcuately disposed on the arm, and the toothed section of the pawl is arcuately on an elongated section of the pawl and meshes with the toothed section arm when the recliner is in the locked position.

10. The recliner of claim 1 wherein the recliner mounting bracket comprises a main segment and a base segment generally perpendicular to the main segment.

11. The recliner of claim 10 wherein the wedge slides over the base segment of the bracket.

12. The recliner of claim 10 further comprising a second recliner mounting bracket sandwiching the wedge and pawl between the brackets.

13. The recliner of claim 12 wherein the first recliner mounting bracket has at least one embossment to minimize deflection of the wedge.

14. The recliner of claim 12 wherein the first recline mounting bracket has at least one embossment to minimize deflection of the pawl.

15. The recliner of claim 10 wherein the wedge has a travel slot, and further comprising a wedge slide pin mounted on the bracket, extending through the travel slot to restrict the travel of the wedge.

16. A remote release recliner for a motor vehicle seat back, moveable between a locked position in which the seat back is fixed and an unlocked position allowing adjustment of the position of the seat back comprising, in combination:

a mounting bracket;

an arm adapted to be fixedly attached to the seat back, said arm pivotally attached to the mounting bracket and biased by a spring to an upright position, having a toothed section;

an elongate pawl, pivotally mounted on the mounting bracket, a toothed section lockingly engageable with the toothed section of the arm, and a wedge contact surface remote from the toothed section;

a wedge, linearly slidably mounted on the mounting bracket between the locked position in which a wedge end of the wedge biasingly engages the wedge contact surface of the pawl, forcing the toothed section of the pawl into locking engagement with the toothed section arm, restricting motion of the arm, and an unlocked position in which a positive drive out on the wedge contacts a pivot knob on the pawl, forcing the pawl to pivot out of en the arm;

a cam, having a cam surface and a cam thumb, rotatable locked position wherein the cam surface biases the wedge into locking engagement with the pawl, the unlocked position, wherein the cam thumb biases the wedge so that the positive drive out projection on the contacts the pivot knob on the pawl, forcing the pawl to pivot and the toothed section of the pawl to disengage the toothed section of the arm; and a spring biasing the cam towards the wedge.

17. The remote release recliner of claim 16 further comprising a release lever fixedly attached to the cam.

18. A seat for a motor vehicle comprising, in combination:

a seat base and a seat back;

a recliner allowing for adjustment of the seat back position relative the seat base, comprising;

a mounting bracket fixedly attached to the seat base;

an arm pivotably attached to the mounting bracket and fixedly attached to the seat back and having a generally arc-shaped toothed section;

a pawl, pivotably attached to the mounting bracket and having a generally arc-shaped toothed section which releasably lockingly engages the toothed section of the arm;

a wedge linearly slidable between a locked position in which the wedge directly contacts the pawl, forcing the pawl into locking engagement with the arm, and an unlocked position in which the wedge moves the pawl out of locking engagement with the arm;

a remote release lever positioned adjacent one edge of the seat base; and a cam fixedly attached to the remote release lever for moving the wedge back and forth between the locked position and the unlocked position upon actuation of the remote release lever.

19. The seat of claim 18 further comprising a spring biasing the cam toward the wedge.

* * * * *

UNITED STATES PATENT AND TRADEMARK OFFICE
CERTIFICATE OF CORRECTION

PATENT NO.   :  5,733,007

DATED        :  March 31, 1998

INVENTOR(S) :  Williams

It is certified that error appears in the above-identified patent and that said Letters Patent is hereby corrected as shown below:

On the title page, Item [73] should read  -- Excel Industries, Inc., Elkhart, Ind. --.

Signed and Sealed this

Ninth Day of June, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,733,007
DATED : March 31, 1998
INVENTOR(S) : Williams

It is certified that error appears in the above-identified patent and that said Letters Patent is hereby corrected as shown below:

Title page,
Item [73] should read -- Excel Industries, Inc., Elkhart, Ind. --.

Signed and Sealed this

Eighteenth Day of December, 2001

Attest:

JAMES E. ROGAN
*Attesting Officer*     *Director of the United States Patent and Trademark Office*